United States Patent Office 3,033,830
Patented May 8, 1962

3,033,830
RING - SUBSTITUTED N - ALLYL - 2 - OXAZOLIDI-NONE COMPOUNDS AND POLYMERS THEREOF
William F. Tousignant and Wilhelm E. Walles, Midland, Mich., assignors to The Dow Chemical Company, Midland, Mich., a corporation of Delaware
No Drawing. Filed May 19, 1958, Ser. No. 735,956
7 Claims. (Cl. 260—77.5)

The present invention is germane to the organic chemical arts. It has more pertinent reference to certain ring-substituted N-allyl-2-oxazolidinone compounds, including compounds having alkyl and aryl ring substituents, which are new and useful monoethylenically unsaturated monomeric substances, and to various derivatives thereof particularly polymeric and resinous products that have great utility and provide for many benefits and advantages in numerous applications.

One basic object of the invention is to provide as new compositions of matter, ring-substituted N-allyl-2-oxazolidinone compounds that contain the characterizing group:

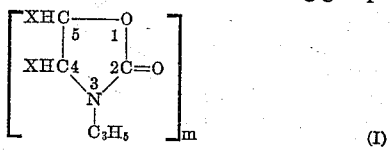

(I)

wherein each X is independently selected from the group consisting of hydrogen, alkyl radicals containing from 1 to about 4 carbon atoms (particularly methyl and ethyl radicals), and aryl radicals containing from 6 to about 10 carbon atoms (particularly phenyl, alkyl substituted phenyl, etc.), with the limitation that not more than one of said substituent members can be hydrogen, and wherein $m$ has a numerical value of at least 1.

A particular object is to provide monomeric ring-substituted N-allyl-2-oxazolidinone compounds of the indicated varieties that are characterizable in having the generic structure:

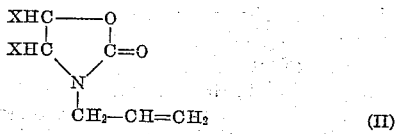

(II)

wherein each X is as above defined.

A specific object is to provide monomeric N-allyl-5-methyl-2-oxazolidinone, which is of the general structure according to Formula II, wherein the X in the 5-position of the ring is methyl and X in the 4-position is hydrogen.

A further object, and one that is of considerable magnitude, is to provide polymeric products, including homopolymers and various copolymers of high polymer nature, that are derived from the N-allyl-2-oxazolidinone monomers of the indicated varieties, especially those derived from N-allyl-5-methyl-2-oxazolidinone.

According to the present invention, the new monomeric compounds which possibilitate the achievement of the above indicated and cognate objects (including the formation of new polymeric products) are of the general structure of Formula II. In general, the monomeric ring-substituted N-allyl-2-oxazolidinone compounds of the present invention are ordinarily clear, colorless or water-white liquids at, or at least near, normal room temperatures. Some of the monomers, however, particularly the aryl (such as phenyl) ring-substituted derivatives, are normally solid, meltable substances. The monomers are ordinarily soluble in water and lower aliphatic alcohols, such as methanol, ethanol, propanol and many other organic solvents. This is generally true for N-allyl-5-methyl-2-oxazolidinone and the other lower alkyl (such as ethyl) ring-substituted species. Bulky substituent units (such as phenyl) often tend to diminish the water-solubility of the monomeric ring-substituted N-allyl-2-oxazolidinone compounds.

For example, N-allyl-5-methyl-2-oxazolidinone is a clear, actually water-white liquid at room temperature which is water-soluble as well as being soluble in methanol, ethanol, styrene, diethylene glycol, diethyl ether, 2-pyrrolidinone (sometimes called 2-pyrrolidone) chloroform, dimethylformamide, nitromethane, acetic acid, aniline ethylene carbonate, the dimethyl ethers of di-, tri-, or tetra-ethylene glycol, dimethyl sulfoxide, and the like. N-allyl-5-methyl-2-oxazolidinone is insoluble in such solvents as cyclohexanol, hexane, kerosene and mineral oil. Under an absolute pressure of about 0.4 mm. Hg, pure N-allyl-5-methyl-2-oxazolidinone boils at a temperature of about 80° C. Of course, the degree of impurity of the monomer may tend to alter the boiling point of the material to some extent. Monomeric N-allyl-5-methyl-2-oxazolidinone has a refractive index, taken at 25° C., of about 1.4631 and a specific gravity, taken at 25° C. and referred to water at 4° C., of about 1.0633. Upon infrared analysis, the monomeric compounds exhibit the characteristic absorption bands that are obtained when N-allyl groups and

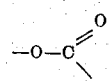

structural formations are present.

The monomeric ring-substituted N-allyl-2-oxazolidinone compounds of the Formula II are usually relatively unstable upon exposure to light, particularly sunlight. Generally, the unstabilized monomers become discolored to a very light shade of yellow within several days of continued exposure to light. However, when they are kept in the dark, particularly when they are maintained under an atmosphere of nitrogen, their natural stability is good. Thus, the monomeric ring-substituted N-allyl-2-oxazolidinone compounds may be stored safely for prolonged periods when maintained so as to be protected in the indicated manner. The monomeric compounds react with solutions of bromine in chloroform, as evidenced by rapid discoloration of the halogen solution, due to the bromination of the allyl groups in the monomer. Dilute solutions of potassium permanganate and the like reagents rapidly oxidize the allyl group of monomeric ring-substituted N-allyl-2-oxazolidinone compounds.

The monomeric ring-substituted N-allyl-2-oxazolidinone compounds of the Formula II may advantageously be prepared by the reaction between an alkali metal salt, such as a sodium or potassium salt, of the starting ring-substituted 2-oxazolidinone compound and allyl bromide at a moderately elevated temperature. For purposes of illustration, the preparation of one of the monomers of the present invention (N-allyl-5-methyl-2-oxazolidinone) is represented by the following equation:

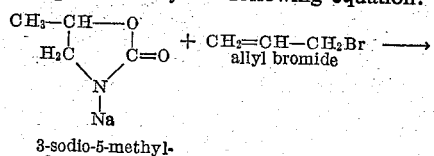

3-sodio-5-methyl-2-oxazolidinone

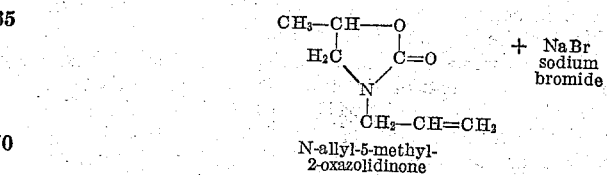

N-allyl-5-methyl-2-oxazolidinone

It is desirable for the reaction to be conducted in a suitable solvent vehicle, such as benzene and the like solvents of the benzene series. The reaction may be performed with benefit at temperatures from about 25 to 80° C. It will occur under any desired pressure although it is generally beneficial to use atmospheric pressure for the reaction. Ordinarily, good conversions and yields of desired product from the converted starting material can be realized within reaction periods of 24 hours or less. By way of illustration, conversions and yields in the neighborhood of 80–90 percent and higher are easily possible to attain. The desired monomeric ring-substituted N-allyl-2-oxazolidinone products can be recovered readily from the reaction mass using procedures that will be readily apparent to those that are skilled in the art. Thus, solvent extraction, fractional distillation, precipitation and/or stripping techniques can be employed for product isolation, depending upon the requirements and circumstances of specific situations.

The ring-substituted N-allyl-2-oxazolidinone monomers will undergo polymerization in mass (which is oftentimes referred to as bulk polymerization) as well as polymerization, at practically any level of concentration, in aqueous or other solution or in emulsion or other dispersion in liquids with which the particular monomer or monomers being polymerized is or are not at all soluble or only partially soluble. It is ordinarily beneficial for the polymerization to be conducted at a temperature between about 50 and 100° C., although this may vary with the particular catalyst, monomer and solvent or carrier, if any, used and the type of reaction being conducted. Suitable catalysts or initiators for polymerization of the monomeric ring-substituted N-allyl-2-oxazolidinone compounds include the peroxygen catalysts, such as hydrogen peroxide, lauroyl peroxide, benzoyl peroxide, potassium persulfate or the like, and ionic catalysts such as boron trifluoride-ether complex, as well as irradiation under the influence of high energy fields, such as X-ray and gamma radiations from radioactive materials (i.e., cobalt-60, cesium-137, etc.) and high energy electron beams generated from linear accelerators, resonant transformers, electrostatic generators and the like. Such diverse forms of radiation catalysts as the actinic radiations, including ultraviolet light, may also be utilized. The azo type catalysts, such as α,α'-azobisisobutyronitrile are not suitable initiators for the polymerization reaction.

Copolymers of various monomeric ring substituted N-allyl-2-oxazolidone compounds of the Formula II, particularly those containing 5-alkyl-substituents, with one another and other monomeric substances copolymerizable therewith may be prepared in ways analogous to those described in the foregoing, including suspension and emulsion polymerization techniques. To such ends, monoethylenically unsaturated monomers such as styrene, vinyl toluene, acrylonitrile, vinyl chloride, vinyl fluoride, vinylidene chloride, methyl acrylate, ethyl acrylate, methyl methacrylate, ethyl methacrylate and other monomeric acrylate and methacrylate compounds, vinyl acetate, vinyl propionate and the like ethenoids (generally characterizable in containing a $CH_2=C<$ grouping), including the N-vinyl lactams such as N-vinyl-2-pyrrolidinone, the several N-vinyl-2-oxazolidinones such as N-vinyl-2-oxazolidinone, N-vinyl-5-methyl-2-oxazolidinone, etc., N-vinyl-3-morpholinone and so forth. Besides those mentioned in the foregoing, other monomers that may be employed suitably for the preparation of copolymerized ring substituted N-allyl-2-oxazolidinone include those that have been disclosed and delineated in United States Letters Patent No. 2,818,362.

When copolymers are prepared, it is frequently desirable for the monomeric ring substituted N-allyl-2-oxazolidinone compound that is employed (or for a mixture of such monomers of the Formula II) to constitute at least about 10 percent by weight of the mixture of copolymerizable materials, e.g., from 10 to 90 or 95 or even as high as 99 percent by weight of such a mixture.

The ring substituted N-allyl-2-oxazolidinone polymers may advantageously be prepared as high polymers having a number average molecular weight, for example, in the range from 10 to 50 thousand and higher (as determinable from Fikentscher K-values of about 5–10 or more), and a structural arrangement containing recurring polymerized units that may be depicted in the following way.

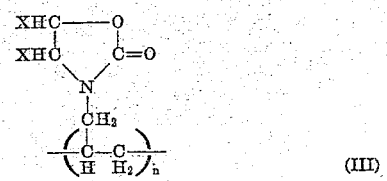

(III)

wherein the X substituents are as above defined and limited and $n$ is a plural integer, preferably one whose numerical value is greater than 5 or 10 to 50 or so and which may be as large as 1,000–2,000 or more. The hydrogen (or other terminal units) which occur in homopolymeric and other polymeric compositions are not shown in Formula III since such details are readily understood by the artisan. Of course, lower and higher molecular weight polymers can also be prepared. It should be taken into account in connection with the above mentioned "number average" molecular weight ranges that the indicated numerical values depend upon the peculiarities of the method of expression which is employed for such statistic. Much higher values, especially in the higher ranges, are equally accurate when the molecular weight is otherwise expressed. Thus, according to the commonly used concept of "weight average" molecular weight (as defined by Frank and Levy, Journal of Polymer Science, 10, 371–8 (1953)), the molecular weight of the polymers, especially in the higher ranges, are significantly larger. In any event, the indicated molecular weight values as well as the value of $n$ are intended to be mere approximate averages rather than discrete limits.

Generally, the ring substituted poly-N-allyl-2-oxazolidinones are hygroscopic, water-soluble materials. They can usually be obtained as light to white colored, free-flowing powders that are ordinarily of an amorphous, noncrystalline nature, as indicated by X-ray analysis. When the polymers are burned, they ordinarily leave a sponge-like residue which tends to indicate the evolution of carbon dioxide during thermal decomposition. As might be expected, the densities, softening points, fusing and melting temperatures and gas evolution points of the individual ring substituted poly-N-allyl-2-oxazolidinones are found to vary with particular species of the homopolymers and copolymers thereof.

The ring substituted poly-N-allyl-2-oxazolidinones can generally be molded under pressure at temperatures between about 100 and 200° C. to produce clear, hard and brittle or glass-like structures, many of which are water-soluble.

Because of their excellent affinity for many of a wide variety of dyestuffs (including direct, basic, acid, vat and other classes of dyes), the ring substituted poly-N-allyl-2-oxazolidinones can ordinarily be employed with great benefit as dye-assisting adjuvants or dye-receptors for synthetic textile fibers and other shaped articles of normally difficult-to-dye synthetic polymers. In this capacity, they may be utilized with exceptional benefit in connection with fiber-forming compositions and filamentary shaped articles produced therefrom of the various acrylonitrile polymers, particularly polyacrylonitrile. Besides such desirable utility, certain of the ring substituted poly-N-allyl-2-oxazolidinones exhibit additional utilities of unusual attractiveness. For example, poly-N-allyl-5-methyl-2-oxazolidinone and certain other of the ring substituted poly-N-allyl-2-oxazolidinones of the Formula III may be employed with advantage in wave or curl setting formulations or compositions for human hair; as dye-stripping agents for textile goods and as other varieties of textile assistants; for beverage clarification purposes and in numerous other applications.

The invention is further illustrated in and by the following examples wherein, unless otherwise indicated, all parts and percentages are to be taken by weight.

EXAMPLE A

Preparation of N-Allyl-5-Methyl-2-Oxazolidinone

To a one liter resin kettle, equipped with a water condenser, stirrer, dropping funnel and thermometer, there was added about 117.0 grams (0.9 mole) of 3-sodio-5-methyl-2-oxazolidinone and 1.2 liters of dry benzene. The charge was agitated and to the stirring salt suspension there was added, via stillicide, about 115.0 grams (0.9 mole) of allyl bromide at a temperature of 52° C. over a period of three hours. When the addition was complete, the temperature of the reaction mass was gradually raised to reflux (78.5–82° C.) and held at this temperature for a period of 16 hours. Over this period of time the sodium bromide that was formed precipitated out of the reaction mass. At the termination of this period, the reaction mixture was cooled and the sodium bromide filtered off. The amount of sodium bromide obtained was about 87 grams, 0.85 mole) indicating a 95 percent conversion.

Benzene was removed from the reaction mass under reduced pressure of about 10 mm. Hg absolute at a temperature of 50° C. When the benzene removal was essentially complete, an equal volume of water was added to the remaining liquid giving a homogenous solution. The solution was then extracted three times with equal portions of diethyl ether. The extracted portions were then subjected to mild vacuum (20 mm. Hg absolute) to remove the ether and the remaining oleaginous residue was then vacuum distilled. About 115.8 grams of monomeric N-allyl-5-methyl-2-oxazolidinone was collected as the fraction at 80° C./0.4 mm. Hg. This represented an 82.5 percent yield of desired monomer.

The monomer was a water-white liquid that was soluble in water, lower alkyl alcohols and diethyl ether. Its properties were as follows:

B.P. _____ 80° C./0.4 mm. Hg.
$N_D^{25}$ _____ 1.4631.
$D_4^{25}$ _____ 1.0633.
Empirical formula _____ $C_7H_{11}O_2N$.

| Analysis | Percent C | Percent H | Percent N |
|---|---|---|---|
| Found | 60.13 | 7.92 | 9.13 |
| Calculated | 59.56 | 7.80 | 9.93 |

Similar results are obtained when the foregoing is repeated excepting to use alkali metal salts of 5-ethyl-2-oxazolidinone; 4,5-dimethyl-2-oxazolidinone; 5-phenyl-2-oxazolidinone; and the like to prepare corresponding ring-substituted N-allyl-2-oxazolidinone monomers and when other starting materials are used to make monomers within the scope of Formula II.

EXAMPLE B

Preparation of Poly-N-Allyl-5-Methyl-2-Oxazolidinone

Into a large test tube there was placed about 20.0 grams of the monomer prepared in the first example. To this this there was added about 0.5 gram of ditertiary butyl peroxide as a catalyst. Nitrogen was sparged into the liquid. The polymerization was carried out for 8 hours at 120–140° C. The addition of this solution to diethyl ether caused a precipitate to form. This precipitate became sticky and dark yellow upon standing. The ether was decanted from the material and 2B alcohol (95 percent ethanol denatured with 5 percent benzene) was added in an amount just sufficient to dissolve the sticky mass. This alcohol solution was again added to ether and the polymer precipitated out. Repetition of this procedure gave a very light buff-colored powder when vacuum dried.

The polymeric N-allyl-5-methyl-2-oxazolidinone was found to be soluble in acetone, alcohols, and methylene chloride; very slightly soluble in benzene; and insoluble in diethyl ether and Skelly solvent 100–140° C.

The polymeric product was found to have a Fikentscher K-value of about 12.1 and an average approximate molecular weight of about 13,000.

Its melting point, using the Fisher Johns Apparatus, was 92° C. for fusing and 115° C. for melting to a yellow liquid. Its density was about 1.28 grams per cubic centimeter. The polymeric product molded at 100° C. under 5,000 p.s.i. plate pressure to a clear, light yellow, brittle film.

Similar results are obtained when the foregoing is repeated in order to prepare such polymers as poly-N-allyl-5-ethyl-2-oxazolidinone; poly-N-allyl-4,5-dimethyl-2-oxazolidinone; poly-N-allyl-4-methyl-2-oxazolidinone; poly-N-allyl-4-ethyl-2-oxazolidinone; poly-N-allyl-5-phenyl-2-oxazolidinone; and other of the homopolymers of Formula III, using appropriate starting monomers for their preparation.

EXAMPLE C

Use of Poly-N-Allyl-5-Methyl-2-Oxazolidinone (PAOM)

A polyacrylonitrile fiber is obtained in a water-hydrated or aquagel condition in which it contains about 2 parts of water to each part of polymer therein. The aquagel, which is oriented by wet stretching after extrusion, is obtained in a known manner by salt-spinning a solution containing about 10 percent of fiber-forming polyacrylonitrile in a 60 percent aqueous zinc chloride solvent therefor into an aqueous coagulating bath containing about 42 percent of zinc chloride. The aquagel fiber is immersed at room temperature in a 3 percent aqueous solution of poly-N-allyl-5-methyl-2-oxazolidinone having a Fikentscher K-value of about 12 until about 10 percent (on the dry weight of the resulting fiber product) of the water-soluble polymer is incorporated therein. After the impregnation, the fiber product is dried at about 150° C. for 30 minutes to convert it to a hydrophobic form. It is found to be readily dyeable to deep and level shades of coloration upon a 4 percent dyeing in the conventional manner with Calcodur Pink 2BL, a direct dyestuff having the Colour Index 353. The PAOM-containing fiber product is also readily and excellently dyeable with such dyestuffs as Sevron Brilliant Red 4G (formerly known as Basic Red 4G—Colour Index Basic Red 14), a basic dyestuff; Amacel Scarlet BS, an acetate dyestuff (American Prototype No. 244); Calcocid Alizarine Violet, an acid dye (Colour Index 1080) and the like.

Excellent results similar to those demonstrated in the foregoing can also be obtained with other of the ring substituted N-allyl-2-oxazolidinone polymers of the Formula III and copolymers containing such recurring units, and when the polymeric products are utilized for such purposes as dye-stripping agents, for clarifying such beverages as beer and wine, in hair setting formulations, and in numerous other applications.

What is claimed is:

1. A monomeric compound of the structure:

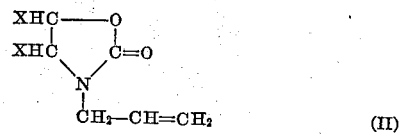

(II)

wherein each X is independently selected from the group consisting of hydrogen, alkyl radicals containing from 1 to 4 carbon atoms, and aryl radicals containing from 6 to 10 carbon atoms, with the limitation that not more than 1 of said X substituents can be hydrogen.

2. Monomeric N-allyl-5-methyl-2-oxazolidinone.

3. An addition polymer having as an essential constituent of its polymeric structure material interpolymerized characterizing proportions of the recurring group:

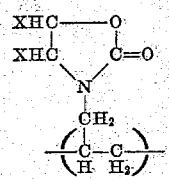
(III)

wherein each X is independently selected from the group consisting of hydrogen, alkyl radicals containing from 1 to 4 carbon atoms, and aryl radicals containing from 6 to 10 carbon atoms, with the limitation that not more than 1 of said X substituents can be hydrogen.

4. An addition copolymer polymerized from ingredients including (a) a monomer and (b) a compound which is different from the compound of (a), is copolymerizable therewith and which contains a $CH_2=C<$ grouping.

5. The copolymer in claim 4, wherein the compound of (b) is a vinyl compound.

6. An addition polymer of N-allyl-5-methyl-2-oxazolidinone.

7. A homopolymer characterized by having as chemically combined recurrent groups in its molecule:

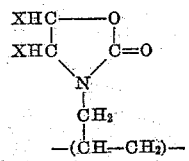

wherein each X is independently selected from the group consisting of hydrogen, alkyl radicals containing from 1 to 4 carbon atoms, and aryl radicals containing from 6 to 10 carbon atoms, with the limitation that not more than one of said X substituents can be hydrogen.

References Cited in the file of this patent

UNITED STATES PATENTS

| | | |
|---|---|---|
| 2,559,011 | Davies et al. | July 3, 1951 |
| 2,755,286 | Bell et al. | July 17, 1956 |
| 2,818,362 | Drechsel | Dec. 31, 1957 |
| 2,818,399 | Drechsel | Dec. 31, 1957 |
| 2,905,690 | Bakke | Sept. 22, 1959 |

FOREIGN PATENTS

| | | |
|---|---|---|
| 858,402 | Germany | Dec. 8, 1952 |
| 722,523 | Great Britain | Jan. 26, 1955 |

OTHER REFERENCES

Ham: "Textile Research Jour.," 7, 1954, pp. 597, 604–614.